3,766,207
1,1-DIALKYL-2-(SUBSTITUTED INDAZOLYL-N¹-METHYL)HYDRAZINES

Pasquale Paul Minieri, Woodside, N.Y., assignor to Tenneco Chemicals, Inc.
No Drawing. Continuation-in-part of application Ser. No. 141,999, May 10, 1971. This application Nov. 22, 1971, Ser. No. 201,166
Int. Cl. C07d 49/18
U.S. Cl. 260—310 C  10 Claims

ABSTRACT OF THE DISCLOSURE

Compounds that have the structural formula

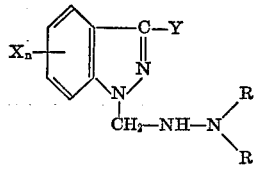

wherein X represents halogen, nitro, amino, acetamino, aroylamino, or (halobenzylidene)amino; Y represents hydrogen or halogen; each R represents a lower alkyl group; and $n$ represents an integer in the range of zero to 2 are used to control the growth of bacteria, fungi, and other microorganisms. Illustrative of these compounds is 1,1 - dimethyl-2-(5,6-dinitroindazolyl-N¹-methyl)hydrazine.

---

This is a continuation-in-part of my copending application Ser. No. 141,999, which was filed on May 10, 1971.

This invention relates to 1,1-dialkyl-2-(substituted indazolyl-N¹-methyl)hydrazines. It further relates to the use of these compounds in the control of the growth of bacteria, fungi, and other microorganisms.

In accordance with this invention, it has been found that 1,1 - dialkyl-2-(substituted indazolyl-N¹-methyl)hydrazines are useful as fungicides and as bactericides. These compounds may be represented by the structural formula

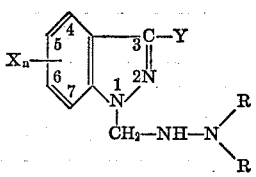

wherein X represents halogen, nitro, amino, acetamino, aroylamino, or (halobenzylidene)amino; Y represents halogen; each R represents an alkyl group having from 1 to 4 carbon atoms; and $n$ represents an integer in the range of zero to 2. Illustrative of these compounds are the following:

1,1-dimethyl-2-(4-acetaminoindazolyl-N¹-methyl)hydrazine;
1,1-dibutyl-2-[6-(p-chlorobenzylidene)aminoindazolyl-N¹-methyl]hydrazine;
1,1-diethyl-2-(3,5-dibromoindazolyl-N¹-methyl)hydrazine;
1,1-dimethyl-2-(3,5,6-trichloroindazolyl-N¹-methyl)hydrazine;
1,1-dimethyl-2-(7-iodoindazolyl-N¹-methyl)hydrazine;
1,1-dimethyl-2-(5-aminoindazolyl-N¹-methyl)hydrazine;
1,1-dipropyl-2-(5,6-dinitroindazolyl-N¹-methyl)hydrazine;
1,1-dibutyl-2-(3-chloro-6-acetaminoindazolyl-N¹-methyl)hydrazine;

and the like.

Particularly effective as biocides are the compounds represented by the structural formula

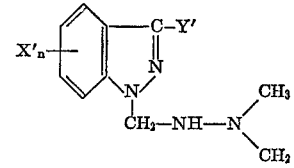

wherein X' represents chlorine or nitro, Y' represents hydrogen or chlorine, and $n$ has the aforementioned significance or is 1. Illustrative of these preferred compounds are the following:

1,1-dimethyl-2-(3-chloroindazolyl-N¹-methyl)hydrazine;
1,1-dimethyl-2-(3-chloro-5-nitroindazolyl-N¹-methyl)hydrazine;
1,1-dimethyl-2-(5,6-dinitroindazolyl-N¹-methyl)hydrazine;
1,1-dimethyl-2-(6-nitroindazolyl-N¹-methyl)hydrazine;
1,1-dimethyl-2-(5-chloroindazolyl-N¹-methyl)hydrazine;

and the like.

The biocidal compounds of this invention may be prepared by any suitable and convenient procedure. For example, they may be prepared by heating the appropriate N¹-hydroxymethyl-substituted-indazole with 1,1-dimethylhydrazine or another 1,1-dialkylhydrazine. The reaction is usually carried out in a solvent, such as benzene, toluene, pyridine, or acetone, at the reflux temperature of the reaction mixture. The N¹-hydroxymethyl-substituted-indazoles may be prepared by the procedure described in my copending application Ser. No. 589,235, which was filed on Oct. 25, 1966, and which is now U.S. Pat. 3,637,736.

The compounds of this invention can be used to control the growth of a wide variety of bacteria, fungi, and other microorganisms. They are of particular value as biocides in surface-coating compositions that contain as their resinous binder, a water-insoluble synthetic linear addition polymer or an oleoresinous binder.

In a preferred embodiment of the invention, the compounds of this invention are used as biocides in aqueous dispersions that contain about 10 to 60 percent by weight of a water-insoluble resinous binder that is a synthetic linear addition polymer and/or an oleoresinous binder. The useful aqueous dispersions of synthetic linear addition polymers are ordinarily prepared by the emulsion polymerization of ethylenically-unsaturated compounds especially those of monoethylenically-unsaturated character. Illustrative of these polymers are polyvinyl acetate; polyvinyl butyrate; polyvinyl chloride; copolymers of vinyl acetate with vinyl chloride, ethylene, or acrylonitrile; copolymers of vinyl chloride with acrylonitrile or vinylidene chloride; polyethylene; polyisobutylene; copolymers of styrene with butadiene, acrylonitrile, or maleic anhydride; copolymers of acrylic acid or methacrylic acid esters of alcohols having 1 to 8 carbon atoms with vinyl chloride, vinyl acetate, acrylonitrile, or styrene; copolymers of the aforementioned acrylic acid esters, the aforementioned methacrylic acid esters, and acrylic acid; and mixtures thereof. Suitable oleoresinous binders include drying oils, bodied drying oils, oleoresinous varnishes, alkyd resins, and mixtures thereof.

In another preferred embodiment of the invention, the novel compounds are used as the biocide in solvent-based systems that contain an oleoresinous binder as hereinbefore defined.

Only a small concentration of the biocidal compound is required to protect the surface-coating composition from attack by microorganisms. As little as 0.10 percent of one or more of these compounds, based on the weight of the composition, will bring about an appreciable improvement in the resistance of the composition to attack by microorganisms. Five percent or more of the biocidal compounds can be used, but these larger amounts generally do not provide further improvement in the properties of the coating compositions and for this reason are not ordinarily used. While the amount of the biocidal compounds that will provide optimum protection for a surface-coating composition depends upon such factors as the choice of biocidal compound, the choice of resinous binder and other ingredients of the composition and the amount of each that is used, and the application for which the coating composition is intended, in most cases about 0.5 percent to 2 percent of the biocidal compound, based on the weight of the surface-coating composition, is used.

In addition to the resinous binder and the biocidal compound, the surface-coating compositions may contain various auxiliary materials, such as pigments, extenders, solvents, dyes, defoaming agents, driers, emulsifiers, plasticizers, and the like in the amounts ordinarily used for these purposes.

The biocidal compounds may be incorporated into the surface-coating composition by any convenient procedure. For example, it can be combined with the pigments and other ingredients to form a pigment phase that is mixed with the resinous binder and water or organic solvent to form the surface-coating composition. Alternatively, it can be added to a composition that contains the resinous binder, pigment, and water or organic solvent. The biocidal compound can be added as such to the other ingredients, or it can be added as a solution in, for example, an alcohol, ether, hydrocarbon, or ketone.

The invention is further illustrated by the following examples.

EXAMPLE 1

To 200 ml. of toluene, which had been dried by azeotropic distillation, was added with stirring 18.3 grams (0.1 mole) of $N^1$-hydroxymethyl - 3 - chlorindazole and 6.6 grams (0.11 mole) of 99%, 1,1-dimethylhydrazine. The reaction mixture was heated at its reflux temperature until 1.8 ml. of water had been evolved and then for an additional 30 minutes at this temperature. The reaction mixture was cooled and allowed to stand overnight at room temperature. It was then cooled in an ice bath and filtered. The product was dried at 50° C. under vacuum. There was obtained 9.9 grams of 1,1-dimethyl-2-(3-chloroindazolyl-$N^1$-methyl)hydrazine, which melted at 145°–150° C.

The filtrate was evaporated to dryness under reduced pressure on a water bath. The residue was crystallized from 35 ml. of toluene and dried at 50° C. under reduced pressure to yield an additional 4.0 grams of the product, which melted at 145°–150° C. The two crops of the product were combined and analyzed. The 1,1-dimethyl-2-(3-chloroindazolyl-$N^1$-methyl)hydrazine contained 54.25 percent C, 2.98 percent H, and 18.23 percent N (calculated, 56.8 percent C, 6.2 percent H, and 19.9 percent N).

EXAMPLE 2

Using the procedure described in Example 1, 18.3 grams (0.1 mole) of $N^1$-hydroxymethyl-5-chloroindazole was reacted with 6.6 grams (0.11 mole) of 99% 1,1-dimethylhydrazine. There was obtained a first crop yield of 49% and a second crop yield of 15.5% of the product. The 1,1 - dimethyl-2-(5-chloroindazolyl-$N^1$-methyl)-hydrazine obtained melted at 141°–143.5° C. and contained 54.9 percent C, 3.3 percent H, 18.13 percent N, and 23.4 percent Cl (calculated, 56.8 percent C, 6.2 percent H, 19.9 percent N, and 16.8 percent Cl).

EXAMPLES 3–8

A series of 1,1-dimethyl-2-(substituted indazolyl-$N^1$-methyl)hydrazines was prepared by the following procedure: To 150 ml. of dry toluene was added with stirring 0.1 mole of an $N^1$-hydroxymethyl-(substituted indazole) and 0.11 mole of 99% 1,1-dimethylhydrazine. The reaction mixture was heated at its reflux temperature until 1.8 ml. of water had been evolved and then for an additional 30 minutes at this temperature. The reaction mixture was cooled to room temperature and filtered. The product was dried at 50° C. under vacuum. The compounds prepared and their properties are given in Table I.

TABLE I

| Ex. No. | Compound | Yield (percent) | Melting point (° C.) |
|---|---|---|---|
| 3 | 1,1-dimethyl-2-(5-nitroindazolyl-$N^1$-methyl)hydrazine. | 98.7 | 208–213 |
| 4 | 1,1-dimethyl-2-(6-nitroindazolyl-$N^1$-methyl)hydrazine. | 66.7 | 178–180 |
| 5 | 1,1-dimethyl-2-(5,6-dinitroindazolyl-$N^1$-methyl)hydrazine. | 71.5 | |
| 6 | 1,1-dimethyl-2-(3-chloro-5-nitroindazolyl-$N^1$-methyl)hydrazine. | 61.5 | 218–223 |
| 7 | 1,1-dimethyl-2-(3-chloro-6-nitroindazolyl-$N^1$-methyl)hydrazine. | 55.6 | 206–208 |
| 8 | 1,1-dimethyl-2-(3,5,6-trichloroindazolyl-$N^1$-methyl)hydrazine. | | |

EXAMPLE 9

(A) A polyvinyl acetate emulsion paint was prepared by mixing together the following materials:

| | Parts by weight |
|---|---|
| Water | 280 |
| Potassium pyrophosphate | 3 |
| Calcium metasilicate | 135 |
| Titanium dioxide (rutile) | 220 |
| 2% aqueous solution of methylcellulose | 200 |
| Diethyl ether of diethylene glycol | 37 |
| 55% aqueous dispersion of polyvinyl acetate | 350 |

To samples of this paint was added 2 percent by weight of one of the compounds of this invention or a comparative biocide.

(B) An acrylic latex paint was prepared by mixing together the following materials:

| | Parts by weight |
|---|---|
| Titanium dioxide | 114 |
| Mica (waterground) | 14 |
| Calcium carbonate | 57 |
| Water | 70 |
| 25% aqueous solution of sodium salt of maleic anhydride/diisobutylene copolymer | 4 |
| Ethylene glycol | 9 |
| Hydroxyethylcellulose | 1 |
| Ammonium hydroxide (28% aqueous) | 1 |
| Latex of acrylic ester polymer (46% solids) | 249 |

To samples of this paint was added 2 percent by weight of one of the compounds of this invention or a comparative biocide.

(C) The following standard test procedure was used: Pieces of draw-down paper were dipped into each of the treated paints, dried for 24 hours, and again dipped into the paint and dried. The coated paper samples were cut in 1¼ inch squares. Each of the coated paper squares thus prepared was placed on a plate of malt and mycophil agar, which had previously been inoculated with 1 ml. of a suspension of the test organism. The plates, prepared in triplicate, were incubated at 28° C. and observed weekly. The growth was estimated according to the following key, and the results of the replicate plates were averaged:

ZO=Zone of inhibition in mm.
0=No zone of inhibition
Tr=Trace of zone of inhibition The results obtained are summarized in Table II.

TABLE II

| Polyvinyl acetate paint | Biocide | | Bis(phenyl-mecury) do-decenylsuc-cinate (Super Ad-itr) |
|---|---|---|---|
| | Product of— | | |
| | Ex. 4 | Ex. 5 | |
| pH of paint | 7.2 | 7.4 | 6.9 |
| Color of paint | (1) | (1) | (2) |
| Mixed inoculum containing *P. aeruginosa* ATCC 10145, *A. aerogenes* ATCC 7256, and 3 strains of Bacillus | ZO-1 | ZO-5 | ZO-7 |
| *Bacillus subtilis* | Tr | ZO-7 | ZO-10 |
| *Aerobacter aerogenes* | Tr | Tr | ZO-2 |
| Acrylic paint: | | | |
| pH of paint | 9.3 | 9.1 | 8.4 |
| Color of paint | (1) | (1) | (2) |
| Mixed inoculus containing *P. aeruginosa* ATCC 10145, *A. aerogenes* ATCC 7256, and 3 strains of Bacillus | ZO-2 | ZO-4 | ZO-6 |
| *Bacillus subtilis* | ZO-5 | ZO-6 | ZO-9 |
| *Aerobacter aerogenes* | ZO-4 | ZO-3 | ZO-1 |

[1] Beige.  [2] Off white.

Each of the other 1,1-dimethyl-2-(substituted indazolyl-$N^1$-methyl)hydrazines herein disclosed can be used in a similar manner to inhibit or prevent the growth of microorganisms in surface-coating compositions.

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

What is claimed is:

1. A compound having the structural formula

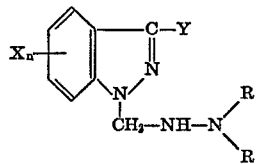

wherein X represents halogen or nitro; Y represents hydrogen or halogen; each R represents alkyl of 1 to 4 carbon atoms; and n represents an integer in the range of zero to 2.

2. A compound as set forth in claim 1 that has the structural formula

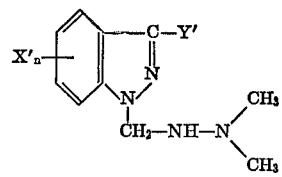

wherein X' represents chlorine or nitro, Y' represents hydrogen or chlorine, and n represents an integer in the range of zero to 2.

3. A compound as set forth in claim 2 wherein X' is chlorine and n is 1.

4. A compound as set forth in claim 2 wherein X' is nitro and n is 1.

5. The compound as set forth in claim 2 that is 1,1-dimethyl-2-(3-chloroindazolyl-$N^1$-methyl)hydrazine.

6. The compound as set forth in claim 2 that is 1,1-dimethyl-2-(5,6-dinitroindazolyl-$N^1$-methyl)hydrazine.

7. The compound as set forth in claim 2 that is 1,1-dimethyl - 2 - (3 - chloro - 5-nitroindazolyl-$N^1$-methyl)hydrazine.

8. The compound as set forth in claim 2 that is 1,1-dimethyl-2-(6-nitroindazolyl-$N^1$-methyl)hydrazine.

9. The compound as set forth in claim 2 that is 1,1-dimethyl-2-(5-chloroindazolyl-$N^1$-methyl)hydrazine.

10. The compound as set forth in claim 2 that is 1,1-dimethyl - 2 - (3,5,6 - trichloroindazolyl-$N^1$-methyl)hydrazine.

References Cited

Minieri: Chem. Abst. vol. 71, Nos. 124430a and 124431b (1969).

Pozharskii et al.: Chem. Abst. vol. 62, columns 4021–2 (1965).

Zhao et al.: Chem. Abst. vol. 54, column 1500 (1960).

NATALIE TROUSOF, Primary Examiner

U.S. Cl. X.R.

106—15 AF; 424—273